Feb. 27, 1934.    G. W. PANCOE    1,949,027

AIRPLANE COWL FASTENER

Filed Feb. 29, 1932

INVENTOR.
George W. Pancoe
BY
John A. Sanborn
ATTORNEY

Patented Feb. 27, 1934

1,949,027

UNITED STATES PATENT OFFICE 1,949,027

AIRPLANE COWL FASTENER

George W. Pancoe, Brooktondale, N. Y., assignor to Thomas-Morse Aircraft Corporation, a corporation of New York Application February 29, 1932. Serial No. 595,769

8 Claims. (Cl. 24—211)

My invention relates to fastening devices generally, and more specifically to a type of separable fastener, for use in securing the engine cowling or other members constructed of sheet material, such as hoods, hatches, baggage doors, covers for inspection or service openings, or streamline fairing to other parts of an aircraft.

With the increasing use of metal in the construction of both airplanes and lighter-than-air craft, the need has developed for a simple and positive fastening device which may be readily operated by hand, requiring no tools for its manipulation, and which by reason of few projections extending beyond the contour of the aircraft presents a minimum of resistance to air flow. It is also essential that the component parts of the device be permanently attached to some other part of the fastener or to the members which it is desired to secure together so that there will be no loose parts to become displaced or lost.

Many of the cowling fasteners heretofore known to the art are either of the spring held type which in practice become distorted after use until their function becomes imperfect and insecure, or are of the lever actuated type in which considerable inconvenience and distress are experienced in operation due to the fact that the action of the levers is complicated and likely to become broken and inoperative during the ordinary usage to which such fasteners are subjected.

In some previous types of fasteners, the pressure exerted by the sheet metal cowling against the lever of the fastening device necessitates the insertion of a sharp-edged tool between the cowling and the airplane body each time the lever has been operated to release the fastener and to separate the members by actually prying the fastener apart. It has also been an occasional fault of prior devices that the action of the levers has not been positive enough to prevent the cowling from becoming unfastened during service. This has been more generally true in the case of the spring held types of fasteners in which the tension or compression produced by the spring is relied upon directly to maintain the relative position of the parts.

It is an object of the present invention to provide a self-contained positive locking fastener in which all of the above and other disadvantages have been overcome and in which the parts are so designed that the same may be operated by a simple movement of a hand lever without the use of any special tool or equipment.

Another object of my invention is to provide a fastening device which presents a minimum of resistance to air flow over the surfaces thereof and which has no loose parts to become displaced or lost.

I propose to incorporate in a fastening device of the type herein disclosed in combination with an engaging member and an engaged member, a means comprising the cover plate of the device for holding the engaging member in positive engagement with said engaged member or out of engagement therewith.

I further propose to provide in the above combination an engaging member comprising a spring movable with respect to said means, the force of which is held in different degrees of restraint depnding upon the position of the spring with reference to said means.

Another object of my invention is to provide a fastening device for airplane cowlings in which a conical stud having a neck of reduced cross section and an enlarged head may be engaged by the action of a lever actuated attachment to hold a cowling or other member to which the attachment is secured in fixed position relative to a metal fuselage covering or other part of the engine cowling.

A still further object of my invention is to provide a cowling fastener in which the attachment consists of a face plate which is pressed out to provide a recess, the opposite sides of which present cam shaped surfaces adapted to restrict the movement of a resilient lever slidable between the face plate and a suitable back plate to fix the limits between which the lever engages the neck of a stud when the latter is projected into a socket formed by openings passing through the face and the back plates, and a position in which the stud may be separated from the socket to release the cowling.

It is also an object of the present invention to incorporate the desirable features outlined above in a device of the character set forth in which the combined cover plate and cam shaped surfaces, and the back plate, comprise sheet metal stampings which may be manufactured economically and with facility by a simple manufacturing process without the use of special equipment.

The invention is also characterized by the fact that the only moving part in the device comprises a spring lever having projections adapted to engage the cam shaped faces formed by the cover plate, and since the force of the spring is utilized merely to maintain the lever in open or closed position with reference to the cover plate, and by so doing to move the spring under its own force into or out of engagement with the sides of the stud, the spring may also be constructed of ordinary material and at a small cost of manufacture. Assembly of the attachment part of the fastener is accomplished as will be clear from the accompanying description by an entirely conventional riveting process. The stud is secured to the body of the airplane fuselage or other part by peening the end of the stud itself or by any other well known device.

With the above and other objects in view, this invention consists of the novel features of construction, combination and arrangement of parts. hereinafter fully described, claimed and illustrated in the accompanying drawing, forming parts of this specification. I desire to have it understood that the apparatus shown is by way of example only and although considered to represent an acceptable embodiment of the invention, is susceptible of modification within the scope of the claims appended hereto.

In the drawing, briefly described as follows, similar characters of reference indicate corresponding parts in all the views.

Figure 1:
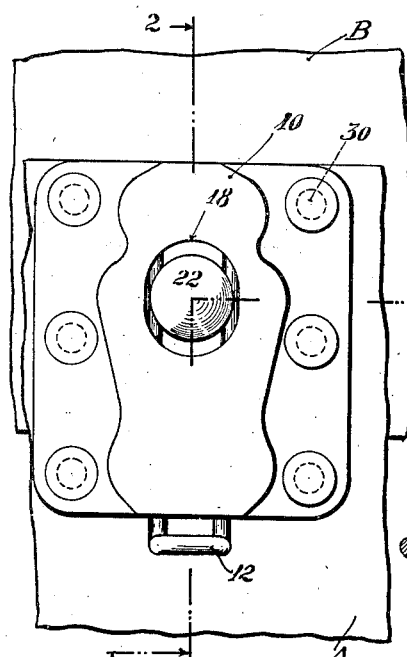
Figure 1 is a plan view of the improved fastening device showing the same in closed position.
Figure 2:
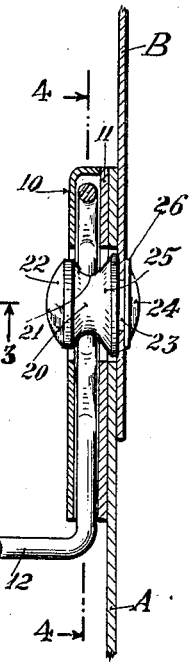
Figure 2 is a sectional view taken in the plane of line 2—2 of Figure 1 showing the relative position of the stud and the locking lever when in closed position.

The different parts of an aircraft which it is desired to secure together are shown in Figures 1 to 5, inclusive, and designated A and B, respectively. The member A is constructed of more or less flexible sheet material in the case of an engine cowling or metal fairing, or of heavier plate material in the case of hoods, hatches, baggage doors, or covers for the various openings in an airplane structure. The member A overlaps the member B substantially the width of the fastener, or, as shown in the drawing, an amount sufficient to provide a bearing surface to prevent buckling and to give rigidity to the joint. In the usual application of the fastener to an airplane engine cowling, the device as shown will be inverted so that the member B will represent the rigid side wall of the fuselage. It is to be understood that the member B, however, may also consist of flexible sheet material, as when hemispherical or other type cowlings are joined together for a portion or throughout their their entire length.

The attachment portion of my improved fastener comprises a cover plate 10, a flat back plate 11 and a resilient lever 12. In the embodiment of the invention shown in the drawing, the cover plate is pressed out to form a recess 13 adapted to retain the lever 12 and to permit a limited movement of the spring within the recess provided between the plates 10 and 11 when the same are secured together and to the member A in a manner hereinafter described. The cover plate 10 is apertured as shown at 18 at a point directly in line with similar openings 19 passing through the back plate 11 and the member A to which both plates are secured.

The member B, which as previously stated may be a sheet metal member or a rigid portion of the airplane structure, carries the element 20 secured thereto and adapted to extend through the aligned openings 18 and 19 which in effect form a socket for the reception of the member 20 between the arms of the lever 12. The element 20 is shown as a conical stud having a neck 21 of reduced cross section and an enlarged head 22 which is rounded for the purpose of reducing the resistance due to air passing over the fastening device. The neck portion 21 of the stud coincides with the plane of cross section of the lever 12 when the stud is inserted in the socket formed by the openings 18 and 19, and is given a curvature slightly larger than the diameter of the wire of which the lever 12 is constructed. The base portion of the stud 20 terminates in an extension 23 adapted to pass through a suitable opening in the member B and to be peened as shown at 24 to draw the base 25 of the stud 20 and the washer 26 into engagement with opposite sides of the member B and secure the stud permanently thereto. It is to be understood that the stud 20 may be secured to the member B by other methods with equally as good results depending upon the material of which the member B is composed or to meet other requirements of structure or convenience in assembling the parts.

The inner side walls of the recess 13 are given a characteristic shape in the form of cam shaped surfaces as shown at 14, 15, 16 and 17 symmetrical with respect to the center line of the attachment portion of the fitting, and of opposite curvature so as to provide bearing surfaces over which the projections 12' and 12'' of the lever 12 may slide to move the arms of the lever 12 into and out of engagement with the neck 21 of the stud 20 and to restrict the movement of the lever between extreme positions in which it is held against displacement, whether the lever is in engaging position or not, except by movement of the lever itself to the other extreme position.

Figure 4:
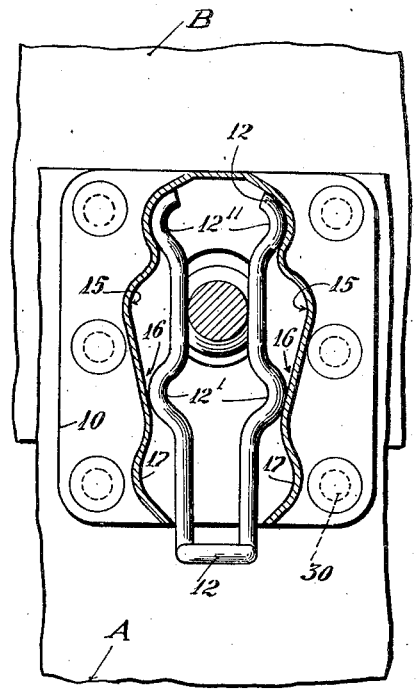
Figure 4 is a cross sectional plan view taken on the line 4—4 of Figure 2.
Figure 3:
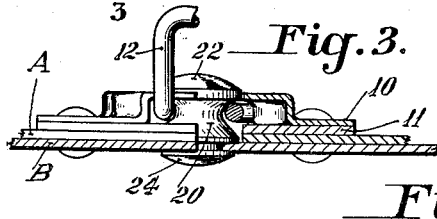
Figure 3 is a view in elevation of the fastener in closed position partly in section taken on the line 3—3 of Figure 1.

It is to be noted that in locked position the bearing surfaces 12' of the lever 12 engage the opposite portions of the cam shaped surfaces designated 16, while in the same position the bearing surfaces 12'' engage the portions 14, which provide a curvature substantially coinciding with that of the surfaces 12'', to hold the spring firmly in the position shown in Figure 4. The force of the spring is acting against the opposed surfaces at all times so that although the arms of the spring engage the neck 21 of the stud 20 in this position, any stress imposed as a result of the latter engagement is carried by pressure of the spring against the back plate, or, under some circumstances, by the pressure of the spring against the cover plate.

Figure 5:
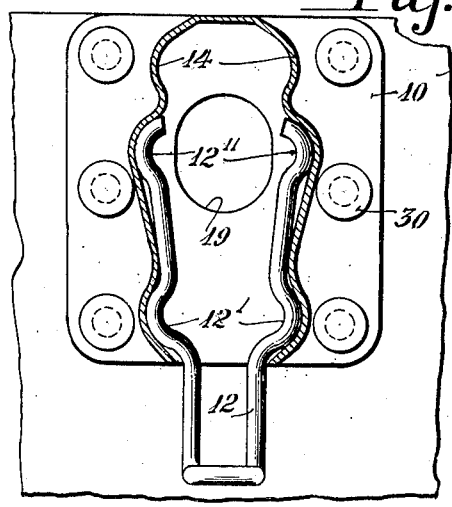
Figure 5 is a cross sectional plan view similar to Figure 4 except that the locking lever is shown in open position and with the stud withdrawn.
Figure 5:
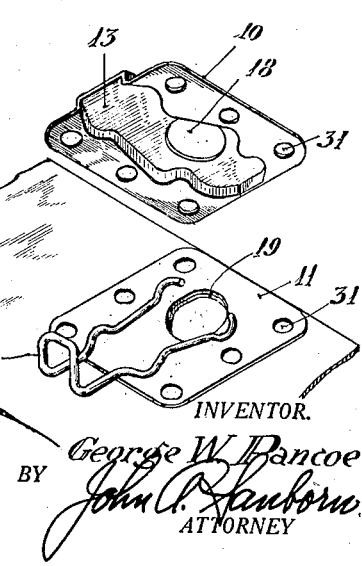

In unlocked position as shown in Figure 5, the bearing surfaces 12' engage the portions 17 of the cam shaped surfaces while the surfaces 12'' are retained in the curvature of the portions 15. In this position, both portions 15 and 17 tend to hold the spring against displacement except by direct application of manual force to move the lever to the other extreme position.

Figure 6:
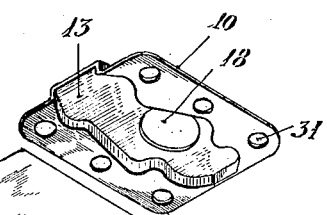
Figure 6 is a perspective view of the elements comprising the attachment part of the improved fastening device showing the underside of the cover plate and the locking lever lying on the back plate in position for assembly.

The process of assembling the attachment part of the device is comparatively simple. The back plate 11 is placed in position with the aperture 19 coinciding with the similar aperture in member B. The spring 12 is placed in position as shown in Figure 6, and the cover plate 10 is then placed in position over the spring which must be compressed as the cover plate is seated on the back plate so as to be retained to function as described above within the recess 13. Rivets 30 are then inserted in the coinciding holes 31 and pressed or headed to secure the parts together.

The spring member 12 constitutes the only moving part of the device, and since the force of the same acts against the opposite sides of the recess 13 in all positions of the spring, and due to the fact that the bearing surfaces 12' are of such dimensions that the spring cannot be withdrawn from the recess 13 after the cover plate and back plate have been assembled, the spring is in effect permanently secured to the member A and cannot become lost or displaced.

As previously stated, that portion of the head of the stud 20 which extends beyond the surface of the cover plate is rounded so practically no resistance is offered to the air stream. The edges of the cover plate 10 and the portion of the spring 12 which is turned out to provide a lever for manually operating the device are also rounded to offer small resistance to the air stream.

It is thought that the description has been in such detail that the operation of the device is obvious. When the lever 12 is in the position shown in Figure 5, the member A, which may be the engine cowling or other part of an airplane, is free to be removed, the studs being free to be withdrawn from the sockets formed by openings 18 and 19 in the cover plate and back plates, respectively. In order to replace the cowling and to secure the same firmly in place with respect to the member B, which may be a fixed part of the fuselage framework or another cowling or movable member, it is necessary only to insert the studs 20 in the sockets formed by openings 19 and to move the lever 12 to the position shown in Figures 1 to 4. Although the force of the spring 12 presses the surfaces 12' and 12" against the respective cam shaped surfaces which the same are adapted to engage with sufficient force to prevent displacement under all conditions of operation to which the fasteners would be subjected, this force is not so great that the lever 12 cannot be readily moved from one position to the other by manual effort so that no tools whatsoever are required for the operation of the device.

Having described an acceptable embodiment of my invention and its manner of operation, I wish it to be understood that I do not desire to be limited to the exact details shown and described, for the reason that modifications coming within the scope of the appended claims will be apparent and occur to persons skilled in the art.

I claim as my invention:

1. A stud-engaging member for a fastening device comprising, in combination, a cover plate, a back plate to which said cover plate is attached having an opening therein for receiving a stud member, the said cover plate being pressed out to form a recess having oppositely disposed cam shaped surfaces, and a resilient engaging member held in said recess, said engaging member being slidable with respect to said cover plate and having corresponding projections operatively associated with said cam shaped surfaces.

2. A stud-engaging member for a fastening device comprising, in combination, a cover plate, a back plate to which said cover plate is attached having an opening therein for receiving a stud member, the said cover plate being pressed out to form a recess having oppositely disposed cam shaped surfaces, and a resilient engaging member held in said recess, said engaging member being slidable with respect to said cover plate and having normally diverging arms operatively associated with said cam shaped surfaces.

3. A stud-engaging member for a fastening device comprising, in combination, a cover plate, a back plate to which said cover plate is attached having an opening therein for receiving a stud member, the said cover plate being pressed out to form a recess having oppositely disposed cam shaped surfaces, and a resilient engaging member having normally diverging arms held in said recess, the said engaging member having corresponding projections on said arms operatively associated with said cam shaped surfaces and being movable with respect thereto, the force of said member being held in different degrees of restraint depending upon its position with respect to said surfaces.

4. A fastening device comprising, in combination, a cover plate, a back plate to which said cover plate is attached, said cover and back plates having registering openings therein, the said cover plate being pressed out to form a recess having oppositely disposed cam shaped surfaces, a resilient engaging member held in said recess, and an engaged member passing through the openings in said cover plate and the said back plate, the said engaging member having corresponding projections operatively associated with said cam shaped surfaces and being movable in said recess into and out of engagement with said engaged member.

5. A fastening device comprising, in combination, a cover plate, a back plate to which said cover plate is attached, said cover and back plates having registering openings therein, the said cover plate being pressed out to form a recess having oppositely disposed cam shaped surfaces, a resilient engaging member having normally diverging arms held in said recess, and an engaged member passing through the openings in said cover plate and the said back plate, the said engaging member having corresponding projections on said arms operatively associated with said cam shaped surfaces and being movable from a position in which said engaged member is free to be removed from said openings to a position in which said arms are forced toward each other by action of the said surfaces into engagement with said engaged member.

6. A fastening device comprising, in combination, a cover plate, a back plate to which said cover plate is attached, said cover and back plates having registering openings therein, the said cover plate being pressed out to form a recess having oppositely disposed cam shaped surfaces, a resilient engaging member having normally diverging arms held in said recess, and an engaged member passing through said openings in said cover plate and the said back plate, the said engaging member having corresponding projections on said arms operatively associated with said cam shaped surfaces and being movable with respect thereto, the action of said surfaces being such as to restrict the movement of said engaging member to fix the limits between which it is held in engagement with the said engaged member and a position in which the said engaged member is free to be withdrawn from such openings.

7. A fastening device comprising, in combination, a cover plate, a back plate to which said cover plate is attached, said cover and back plates having registering openings therein, the said cover plate being pressed out to form a recess having oppositely disposed cam shaped surfaces, a spring having normally diverging arms held in said recess, and a stud having a head and a neck of reduced section passing through the openings in said cover plate and the said back plate, the said spring having corresponding projections on said arms operatively associated with said cam shaped surfaces and being slidable bodily in said recess into and out of engagement with the neck of said stud.

8. A fastening device comprising, in combination, a cover plate, a back plate to which said cover plate is attached, said cover and back plates having registering openings therein, the said cover plate being pressed out to form a recess having oppositely disposed cam shaped surfaces, a spring having normally diverging arms held in said recess, and a stud having a head and a neck of reduced section passing through the openings in said cover plate and the said back plate, the said spring having corresponding projections on said arms operatively associated with said cam shaped surfaces, the said spring being slidable bodily in said recess from a position in which said stud is free to be removed from said openings to a position in which said arms are forced toward each other by the action of the said surfaces into positive engagement with the neck of said stud.

GEORGE W. PANCOE.